US007813973B2

(12) United States Patent
Gudbjartsson

(10) Patent No.: US 7,813,973 B2
(45) Date of Patent: Oct. 12, 2010

| (54) | INVENTORY MONITORING SYSTEM |
|---|---|
| (75) | Inventor: Larus Gudbjartsson, Reykjavik (IS) |
| (73) | Assignee: Inventrol LLC, Hanover, NH (US) |
| ( * ) | Notice: Subject to any disclaimer, the term of this patent is extended or adjusted under 35 U.S.C. 154(b) by 1773 days. |
| (21) | Appl. No.: 10/957,984 |
| (22) | Filed: Oct. 4, 2004 |
| (65) | Prior Publication Data |
|   | US 2005/0077352 A1      Apr. 14, 2005 |
|   | Related U.S. Application Data |
| (60) | Provisional application No. 60/510,794, filed on Oct. 10, 2003. |
| (51) | Int. Cl.  *G06Q 10/00* (2006.01) |
| (52) | U.S. Cl. ............... 705/28; 705/16; 177/25; 177/50; 702/173; 702/174; 702/175; 702/179 |
| (58) | Field of Classification Search ............ 705/28 See application file for complete search history. |
| (56) | References Cited |

U.S. PATENT DOCUMENTS

| 4,108,363 | A |   | 8/1978  | Susumu ................ 235/383 |
| 4,419,734 | A | * | 12/1983 | Wolfson et al. .......... 702/129 |
| 4,493,384 | A |   | 1/1985  | Yano et al. ............. 177/25 |
| 4,512,428 | A |   | 4/1985  | Bullivant .............. 177/25 |
| 4,804,052 | A | * | 2/1989  | Griffen ............... 177/25.14 |
| 4,819,015 | A |   | 4/1989  | Bullivant et al. ........ 340/568 |
| 4,891,755 | A |   | 1/1990  | Asher ................ 364/406 |
| 4,958,693 | A |   | 9/1990  | Muraoka et al. ........ 177/25.17 |
| 4,961,533 | A |   | 10/1990 | Teller et al. ........... 177/25.19 |
| 5,074,368 | A |   | 12/1991 | Bullivant ............ 177/50 |
| 5,131,482 | A | * | 7/1992  | Davis et al. .......... 177/25.14 |
| 5,515,737 | A | * | 5/1996  | Imai et al. ........... 73/862.623 |
| 5,608,193 | A |   | 3/1997  | Almogaibil ........... 177/25.13 |
| 6,176,774 | B1 |  | 1/2001  | Filiberti et al. ........ 453/32 |
| 6,260,003 | B1 | * | 7/2001 | Bagley et al. .......... 702/179 |
| 6,384,348 | B1 |  | 5/2002  | Haga et al. .......... 177/25.15 |
| 6,396,002 | B1 |  | 5/2002  | Hove et al. .......... 177/50 |
| 6,571,197 | B1 |  | 5/2003  | Frank et al. |
| 6,707,381 | B1 |  | 3/2004  | Maloney |
| 2001/0007982 | A1 | | 7/2001 | Brown |

(Continued)

OTHER PUBLICATIONS

Plant. (new food processing plant equipment and machinery). Food Trade Review, vol. 64, No. 9, p. 647(15), Sep. 1994.*

*Primary Examiner*—F. Ryan Zeender
*Assistant Examiner*—Fawaad Haider
(74) *Attorney, Agent, or Firm*—Michael J. Weins; Jeffrey E. Sempreba

(57) ABSTRACT

An inventory monitoring system measures changes in weight of an inventory stored on one or more scales. The inventory items are divided into classes by weight, and the system determines the maximum number of items that can be in a combination while maintaining a distinct combined weight. Items are then removed or added, and the change in weight on the scales is correlated to a change in the number of inventory items to track the number of items removed or added over time. In a combined system, scanners are employed to track inventory received or sold, and data from the scanners relating to the items in the inventory is filtered out for comparison to the inventory changes indicated by changes in weight. The system has particular utility for monitoring inventories of cigarettes.

24 Claims, 7 Drawing Sheets

U.S. PATENT DOCUMENTS

| | | |
|---|---|---|
| 2001/0034671 A1 | 10/2001 | Luke et al. .................... 705/28 |
| 2003/0024982 A1 | 2/2003 | Bellis, Jr. et al. |
| 2003/0076736 A1 | 4/2003 | Buker et al. |
| 2004/0034581 A1 * | 2/2004 | Hill et al. ...................... 705/28 |
| 2004/0133474 A1 | 7/2004 | Tami et al. |

* cited by examiner

INVENTORY MONITORING SYSTEM

FIELD OF THE INVENTION

The present invention is for an inventory monitoring system for reporting current inventory and preferably for tracking and reporting inventory changes over time.

BACKGROUND OF THE INVENTION

Inventory control is frequently maintained by monitoring weight changes in the inventory or by scanning when items are entered in or taken out of the inventory. When the method of monitoring weight changes has been used, it is based on converting weight changes. This technique has been classically done by measuring the total weight of a number of items and dividing the measured weight by the nominal item weight to obtain the number of items. The use of such systems have been limited to situations where the items are nominally uniform in weight, and thus would not be practical for use with inventories which have a number of different item weight classes, such as is typically true of inventories of cigarettes.

For items having different weights, systems have been developed that can identify a single item removed based on a measured weight of the item. U.S. Pat. No. 4,891,755 teaches a system for identifying items removed from a hotel mini-bar by measured change in weight. The '755 patent does not address the possibility of more than one item of any weight class being removed at a time. Another patent which discusses the use of weight to identify a class of item is U.S. Pat. No. 4,512,428, which teaches a weighing apparatus where measured weight is employed to determine whether a roll of coins consists of dimes, nickels, or quarters. The '428 patent apparatus also uses weight to count the number of individual coins in the roll. Again, the invention does not address counting multiple items which may differ in weight.

Weight measurement of a combination of items of differing weights has been employed to assure that a combined weight of items matches an expected weight for the combination. One embodiment taught in U.S. Pat. No. 4,108,363 employs such a scheme for an automated store. Similarly, U.S. Pat. No. 6,384,348 teaches such an approach for verifying that fast food orders have been accurately packed. In both cases, this approach is limited to situations where the expected combination of items to be weighed is known, and the measured weight is simply compared to the expected weight.

Alternatively, a scanning system can be employed to monitor inventory, in which case the items are scanned into and out of inventory. This system requires that the items be coded with a scannable tag such as a bar code. The effectiveness of such a system is dependant on the ability to assure that all items removed or added are scanned into and out of inventory.

Thus, there is a need for a system that can maintain an accurate count of an inventory of items that fall into multiple weight classes while single items or combinations of items are added to or removed from the inventory, as well as a system that can track the time dependence of the changes in inventory and monitor the inventory, which can be helpful in maintaining adequate inventory available and in monitoring for potential theft.

SUMMARY OF THE INVENTION

The present invention relates to an inventory monitoring system for monitoring an inventory stored a platform, where the inventory consists of elements from various classes, the classes having different nominal weights.

The inventory monitoring system employs an electronic scale for supporting or suspending the platform. The scale generates a load signal proportional to the load supported on the platform. Electronic scales have one or more load cells which provide load cell signals, and a signal converter converts the load signals into digital signals in a format suitable for reading by microprocessors, microcomputers, and similar devices, typically via a serial port. Such electronic scales are commercially available or can be fabricated from components which are readily available. When a serial port is employed, the signals are formatted in one of several standard formats such as an RS-485 or an RS-232 format. When multiple load cells are employed, the electronic scale also includes a load cell hub which integrates the load cell signals into a single signal.

A microprocessor, a microcomputer or other electronic computer (hereafter referred to as microcomputer) may be used with the system or included as a part thereof. The microcomputer needs one or more data input ports, such as an ethernet port, a serial port (typically formatted in an RS-485 or RS-232 format), or a USB port, that is suitable for accepting the digital signal from the signal converter. The microcomputer also has one or more user input interfaces through which the user can provide instructions, data and programs which form part of the system.

The system has a class weight table which can be entered into the microprocessor via one of the user input interfaces. The class weight table contains the weight values associated with the individual elements of the various classes to be carried on the platform. It is preferred for the class weight table to be obtained from a master class weight table that can be prepared and stored on external media such as a CD or magnetic media. The appropriate values from this master class weight table are selected by employing a selection routine that allows the user to select the appropriate classes from the master class weight table that correspond to the classes to be carried on the platform.

The inventory monitoring system has means for determining the maximum number of elements that can be simultaneously withdrawn from or added to the inventory of classes on the platform while providing a distinct weight, which is referred to hereinafter as the "maximum distinguishable number". These means can be provided by a routine which directs the microcomputer to systematically calculate the weights associated with possible combinations of inventory elements having an increasing number of elements that are to be withdrawn as a unit, and to check the resulting combination weights to determine whether there are any weights that correspond to more than one different combination, rather than to a unique combination.

The routine to determine the maximum distinguishable number also directs the maximum distinguishable number to an output interface of the microcomputer which provides the result to an output device such as a printer, a video monitor, etc., thereby supplying the maximum distinguishable number to the user for reference when using the system.

An addressable platform inventory table having sufficient cells to accommodate data for all classes of elements to be stored on the platform is provided for recording the number of elements stored on the platform. The addressable platform inventory table is accessible by the microcomputer and can be stored in an internal memory or an external memory device. In a more sophisticated system, the addressable platform inventory table can record the different classes of elements and the number of elements in each class stored on the platform.

When a commercial electronic scale is employed, it generally contains a means for checking the stability of the signal, and a means for presenting the weight signal only when the weight signal is stable. If not provided as part a scale, it is preferred for means for checking the stability of the signal after the signal change has been indicated to be provided; such an external means for checking the stability can be a weight signal change sensor that senses either the load cell signal or the digital signal. Furthermore, if the digital signal is sensed, the sensor can be either external to the microcomputer or can be provided by software therein.

Means for calculating and storing the weight change are also provided, which calculate the change in weight indicated by a weight signal change after the signal has stabilized. The means for calculating and storing the weight change can be conveniently provided by software operating the microcomputer.

Means for adjusting the platform inventory table responsive to the stored weight change are provided. This requires the weight change to be converted to the number of elements withdrawn or added to the inventory that are responsible for the change in weight supported, and then adjusting the platform inventory table accordingly. Preferably, adjustments of the platform inventory table are time stamped and stored in a platform inventory log table.

It is preferred that the means for adjusting the platform inventory table include a weight look-up table of distinct weight combinations, that has recorded therein the combinations of weights generated by the means for determining the maximum distinguishable number. These values are preferably stored so that the weights for each of the unique combinations are correlated with the inventory combination which produced that particular weight, and these data are available for subsequent use in determining the inventory removed.

If the platform is loaded and unloaded according to the rules at all times, such that additions and withdrawals are made as directed by the instructions provided to the user regarding the maximum distinguishable number, there is no need for a loading/unloading error reporting means. However, it is preferred that the system be provided means for generating a loading/unloading error message in the event that the weight change cannot be correlated to a valid combination of elements, i.e., a combination having no more elements than the maximum distinguishable number. The loading/unloading error message can be stored in a log as a time-stamped message and/or can provide a warning to the user that an invalid weight change has been detected. Preferably, the weight change is recorded as part of the error message to help determine the nature of the error.

If the rules of adding/withdrawal are violated and an error is recorded, it is preferred that no adjustment in the platform inventory table is made. By not adjusting the platform inventory table, the user will be on notice of a problem and will at least be able to ascertain the magnitude of the unaccounted inventory by physically reconciling the inventory on the platform against the inventory in the platform inventory table.

Maintaining a log of error messages helps a user to determine whether there is a systematic pattern in the occurrence of errors. Also, by comparing sales receipts to the inventory recorded by the scale system, one can obtain an appreciation as to whether the errors are a result or carelessness of the parties removing inventory or whether there is a problem of theft.

When sales are electronically processed, this is frequently accomplished by a general electronic inventory system. The general electronic inventory system uses scanners for scanning in inventory when it is received and scanning out inventory items as they are sold. While such a system will allow reports to be generated that can be compared to the inventory changes resulting from weight changes, it is preferred for the system of the present invention to be provided with a supplemental inventory accounting system, which uses the scanner input to monitor the inventory on the platform but which does not depend on the general electronic inventory system. This supplemental inventory accounting system includes means for extracting and sorting the scanned inventory information to isolate those scanned products which are associated with the products stored on the platform.

The means for extracting and sorting has a data tap which allows the signals that pass through the scanner line to the general electronic inventory system to do so without interfering with transmission of the signals to the general electronic inventory system while allowing the signals to be transmitted to the supplemental inventory accounting system for processing therein. The supplemental inventory accounting system has a filtering routine that screens the tapped signals and passes only those tapped signals associated with the inventory carried on the platform, in order to provide a scanned inventory database. A sorting routine organizes the data to form a scanned inventory table, which stores the scanned-in inventory that is associated with the platform products and where inventory scanned out is subtracted from the scanned inventory table. Preferably, the format of the scanned inventory table is the same as the format of the platform inventory table to simplify subsequent comparisons.

It is further preferred to provide a time log of the scanned inventory which has the same format as the platform inventory log table. This simplifies the comparison, which will be most easily interpreted when the loading and unloading of the platform is done in a manner set forth by the rules discussed above and no errors are reported. If errors are reported, they should be able to be reconciled by a comparison of the time logs.

If the general electronic inventory system is to be used, it should be run in a mode where each element is individually scanned into the system. Furthermore, if the general electronic inventory system has the capacity to re-scan to reverse a sale, the supplemental inventory accounting system is provided with means for correcting for such a re-scan, such as a special bar-coded card that can be scanned by the system scanners and is coded to adjust the supplemental inventory but not affect the general electronic inventory.

If errors are reported and the inventory is to be reconciled, the user can adjust the inventory values in the platform inventory table. This can be done by employing a re-initialization routine for the platform inventory which is preferably included in the system. The re-initialization routine can also be employed if the platform is pre-loaded prior to activating the platform inventory system While the discussion above has been in terms of a system which employs a single platform, for many situations, it is desirable to employ multiple platforms. The use of multiple platforms allows a greater distribution of weight classes, some of which might not be sufficiently separated in weight to be distinguished from other classes unless kept on separate platforms so that they will be part of distinct inventories. Multiple platforms also allow a store using the system flexibility in the configurations and/or locations of the platforms.

Multiple platforms can each be treated in essentially the same manner as a single platform, except that there is a need to report a tag with each weight signal to identify the platform that is the source of that signal if each platform is to have its own look-up table and platform inventory table. Providing each platform with its own look-up table and platform inventory table, rather than providing a master look-up table and master platform inventory table that are common to multiple platforms, allows the elements in the various classes to be sorted onto different platforms to increase the maximum distinguishable number, as well as to allow elements having similar weights to be treated as separate classes. Similarly, while the time-stamped information on the inventory could be combined into a master platform inventory log table, it is preferred for this information to be stored in individual platform inventory log tables for each platform. It is then preferred to provide a combined inventory log table that combines the inventory data from the individual inventory log tables of each of the platforms. When error messages are reported, it is also preferred to provide a separate log table of the error messages to facilitate review of these messages by the user.

To aid in comparing the inventory changes indicated by scanning and by weight, it is preferred for the system to display a graphic output for the user where the time-based data of the platform inventory log table and the time-based data of the time log of the scanned inventory are displayed over a common time interval. It is further preferred for the system to include means for comparing the data from the platform inventory log table and the time log of the scanned inventory for the selected time period to determine whether any discrepancies exist. It is further preferred to provide a summary of the total changes to inventory indicated by the data for each of the platform inventory log table and the time log of the scanned inventory for the desired time period.

DETAILED DESCRIPTION OF THE PREFERRED EMBODIMENTS

The inventory monitoring system of the present invention has many applications, but is particularly well suited for handling an inventory of cigarettes since there are various weight classes of cigarettes formed by different cigarette sizes (i.e., 80's, 100's, 120's) and types of packs (i.e., soft vs. hard). In some cases, different cigarette sizes and pack types have essentially common weight characteristics, such as hard pack 80's and soft pack 100's, and thus would be treated as a single class. Furthermore, the distribution of the weight for a particular pack style is not subject to much variation and this remains true from brand to brand. The same is found to be true for cartons, except that there is less overlap between various types of packages. Also, the weights of the various pack types are not only distinct, but are also not multiples of each other, thus avoiding the potential problem of combinations having a number of items sightly greater than the maximum allowable number to be withdrawn matching with a lesser number combination. Thus, the examples for the embodiments will be discussed in terms of cigarette inventories but could be applied to other inventories having the above described weight characteristics.

Figure 1:
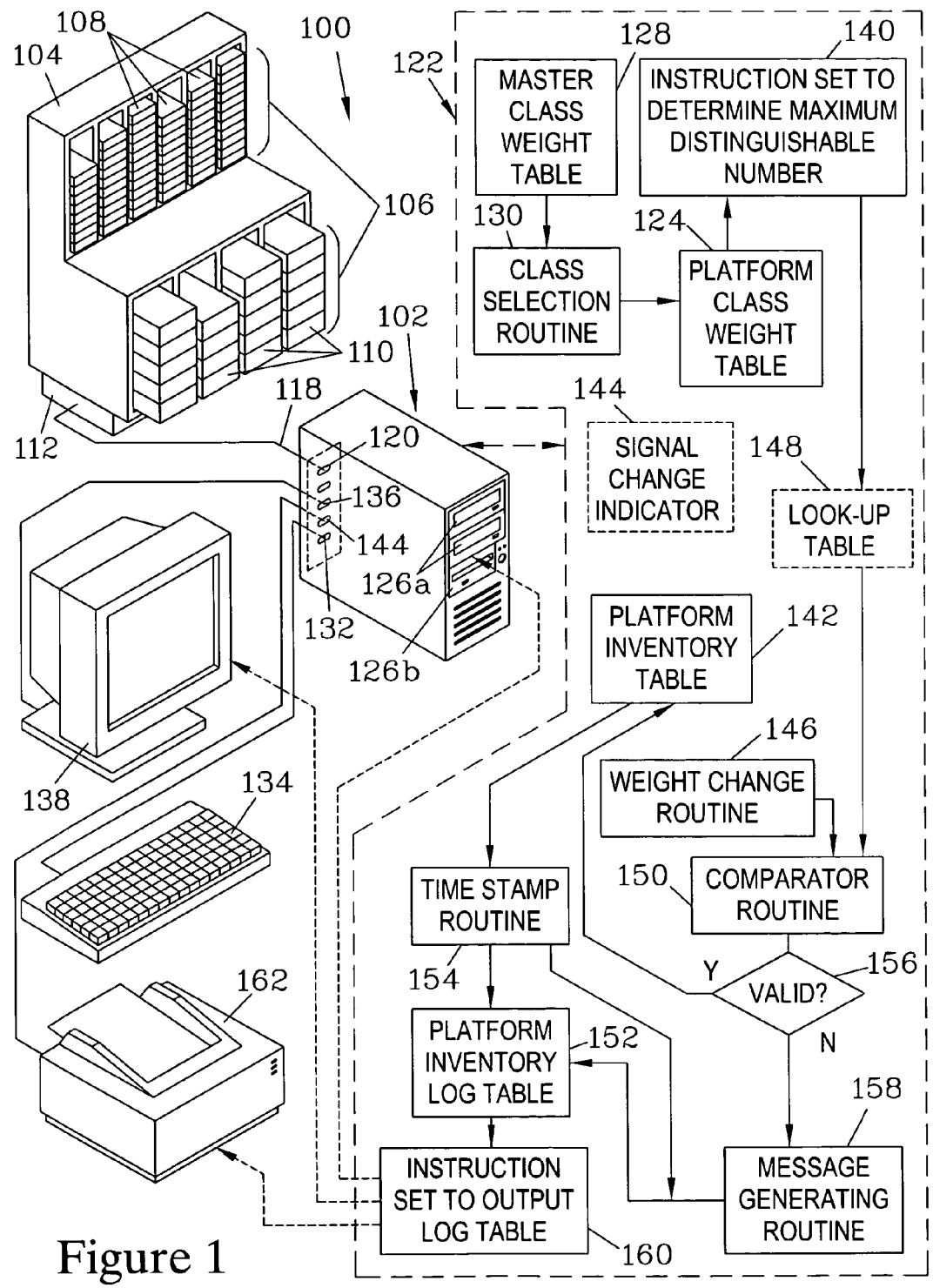
FIG. 1 is a schematic view of an inventory monitoring system of one embodiment of the present invention. The system is designed for monitoring an inventory such as packs of cigarettes as well as cartons of cigarettes that are supported on an electronic scale.

FIG. 1 illustrates an inventory monitoring system 100 which employs a microcomputer 102 which serves to provide many of the elements of the system 100. The inventory monitoring system 100 has a platform 104 on which an inventory 106 is to be stored. The inventory 106 for this example is a combination of packs 108 and cartons 110 of cigarettes. In this embodiment, no provision has been made to allow the cartons 110 to be broken into packages. These packs 108 and cartons 110, in turn, are further classified into weight classes (e.g. soft packs regular, soft pack long, hard packs, slims, etc.).

An electronic scale 112 supports the platform 104. The electronic scale 112 provides a single digital scale signal carried by a scale signal conductor 118 proportional to the load supported by the platform 104. The digital scale signal is fed to an input port 120 on the microcomputer 102. While a microcomputer is employed in this embodiment, other types of microprocessors or computers could be substituted. Electronic scales are frequently configured to provide an RS-232 formatted signal, since such a signal can be readily received by a conventional microcomputer, which typically has an input port adapted to the RS-232 format. One of the limitations of an RS-232 format serial port is that the RS-232 signal has a relatively short transmission distance (50 ft.). The use of an RS-485 format serial port provides a substantial increase in the transmission distance (5,000 ft.), but such a port is frequently not available on microcomputers. One approach to overcoming the range limitations of the RS-232 formatted signal is discussed below with regard to FIG. 2.

The microcomputer 102 is provided with software 122 to allow the microcomputer 102 to perform many of the functions necessary to operate the system 100. The software 122 includes a platform class weight table 124 that lists the weight characteristics associated with each of the different classes of packs 108 and cartons 110 that are to be included in the inventory 106 to be carried by the platform 104. The platform class weight table 124 could be provided on an external media to the microcomputer 102 from a medium such as a CD or a magnetic disk, which can be read into the CPU of the microcomputer 102 via a disk reader/writer 126. If such is directly done, a new disk would be required when the classes of goods to be stored on the platform 104 are altered.

A preferred approach which is employed in the this embodiment is to provide a master class weight table 128 that includes the weight characteristics of all available classes of packs 108 and cartons 110. Since the master class weight table 128 is relatively large, it is preferred to allow the user to select a sub-group of classes corresponding to only those classes that are to be included in the inventory 106 stored on the platform 104. This sub-group substantially reduces the number of combinations which need to be checked to determine the maximum distinguishable number. Limiting the values to be considered can be done by a class selection routine 130 which allows the user to select the appropriate classes from the master class weight table 128 through a user input interface 132, by using a device such as a keyboard 134, to identify the sub-group of classes to be stored on the platform class weight table 124. One approach is to present the various classes for which data is stored on the CD or magnetic disk to the user via an output interface 136 and a monitor 138 for selection. The class selection routine 130 could allow the user to move a cursor over each class to be selected and click on that class to make the class an element of the sub-group. Allowing the user to select appropriate classes from the master class weight table 128 facilitates entering the appropriate class weight information and reduces the possibility of the user entering incorrect weight information.

The software 122 also includes routines that are accessible to the microcomputer 102. The software 122 can include tables that are read into and stored on an internal hard drive associated with the microcomputer 102, or stored on the disk reader/writer 126.

The software 122 includes an instruction set 140 for determining the maximum number of elements (maximum distinguishable number) which can be withdrawn at one time while providing a unique weight. The instruction set 140 operates on the user-supplied weight information for the classes for the packs 108 and the cartons 110 to be stored on the platform 104 and, based on this information, determines the maximum distinguishable number. This is done by employing a routine which directs the microcomputer to systematically calculate the weights associated with possible combinations of inventory elements having an increasing number of elements that are to be withdrawn as a unit, and to check the resulting combination weights to determine whether there are any weights that correspond to more than one different combination, rather than corresponding to a unique combination. The output interface 136 of the microcomputer 102 provides the maximum distinguishable number generated by the instruction set 140 to the monitor 138. The user may then record the maximum distinguishable number for future reference, such as by marking it on the platform 104.

An addressable platform inventory table 142 is provided, which is accessible to the microcomputer 102. Signal change indication software 144 is provided which monitors the change in the digital scale signal as the weight of the inventory 106 varies. This function may not be required in the event that the electronic scale 112 performs this function. Alternatively, a store and compare routine could be used which compares the current value to the last observed value, replaces the last store value with the current value, and provides a notice of a weight change if the values are different.

A weight change routine 146 is provided, which operates on the digital scale signal to calculate the weight change when a change in the digital scale signal has been indicated.

The inventory monitoring system 100 has a look-up table 148 which can be generated by the instruction set 140 that determines the maximum distinguishable number. The look-up table 148 sets forth all possible combinations of packs 108 and cartons 110 that can be added or removed at a time consistent with the maximum distinguishable number and their corresponding weights. Also, there are different ways in which the look-up table 148 can be organized, such as by the number and class of elements in the matching combination, or only by the total number of elements in the combination. Which approach is taken depends on the reporting scheme desired. For theft detection, it is frequently sufficient to categorize the elements by a limited number of broad groups and to only monitor the number of elements in each group, rather than the number of elements in each of the individual classes. For cigarettes, it is sufficient for most uses to only track the number of packs and the number of cartons, regardless of type. It is possible to further reduce reporting to packs only if cartons are each recorded as ten packs.

A comparator routine 150 is provided that compares the weight change determined by the weight change routine 146 which is activated by the signal change indication software 144 to the weight values stored in the look-up table 148 to determine the appropriate combination of elements that have changed in the inventory, and which adjusts the platform inventory table 142 to reflect these changes if a match is found.

To allow the inventory monitoring system 100 to track inventory changes over a period of time, a platform inventory log table 152 is provided for recording and maintaining the values of the platform inventory table 142 as the inventory 106 changes. A time stamping routine 154 is provided, which can run off the clock of the microcomputer 102 for generating a time-stamped record of the platform inventory table 142 at the time of each change in the values in the inventory 106, allowing the platform inventory log table 152 to record changes in the inventory 106 and the time that each change occurred.

The inventory monitoring system 100 is designed to ignore transient variations in the digital scale signal such as might be created by bumping the platform 104. This can be accomplished by only recording changes indicated when the digital scale signal is stable. When transient signal change protection is sought, this function is frequently handled by signal change indication software 144 or, alternatively, the scale 112 could include the capability to ignore transient changes in the digital scale signal.

The inventory monitoring system 100 tracks changes in the inventory 106, provided that the rules for withdrawal are at all times followed such that the user always adds or reduces the inventory 106 by increments that are less than or equal to the maximum distinguishable number. To accommodate possible user errors, it is preferred to provide a validity checking routine 156 which determines whether the weight change determined by the weight change routine 150 corresponds to a value in the look-up table 148 for a combination having no more elements than the maximum distinguishable number, to assure that there is a valid match. If there is a valid match, the platform inventory table 142 is adjusted as discussed above; however, if there is no valid match, then a message generating routine 158 is activated. The message generating routine 158 could provide an error indication to the user via an output device such as the monitor 138, but preferably provides an error message that is time stamped and sent to the platform inventory log table 152 in a comment field.

There are various options as to how to treat weight changes which do not correspond to integral units of inventory or which correspond to one or more combinations having more than the maximum distinguishable number of elements. The preferred option is to simply not reset the platform inventory table 142 in response to the indicated change.

An instruction set 160 to output the platform inventory log table 152 permits the content of the platform inventory log table 152 to be selectively be directed to the CD drives 126a and the magnetic disk drive 126b, and/or to a printer 162 or the monitor 138. The instruction set 160 can be addressed by the keyboard 134 to provide the content of the platform inventory log table 152 when desired by the user. The instruction set 160 could also be responsive to the clock of the microcomputer 102 to operate periodically, such as to provide a daily output of the inventory log table 152. When the platform inventory log table 152 is output in electronic format, this output can be operated on by various data analysis software, such as to provide the user with statistical data regarding the variation of the inventory 106.

While the system discussed above employs only a single platform for storing the inventory, in many situations it is preferred to employ multiple platforms to accommodate a greater number and variety of inventory, such as various packs and cartons of cigarettes. This also allows the type of elements to be divided between the platforms so that, on each platform, the differential between weights is such as to permit a greater number of packages to be withdrawn at one time. Partitioning the inventory on different racks can also allow different elements having the same weight to be monitored separately as distinct classes. Multiple racks can also be employed to provide different sites in a store for the inventory, as well as to have both point-of-sale platforms for providing customers with product and one or more inventory storage platforms.

Figure 2:
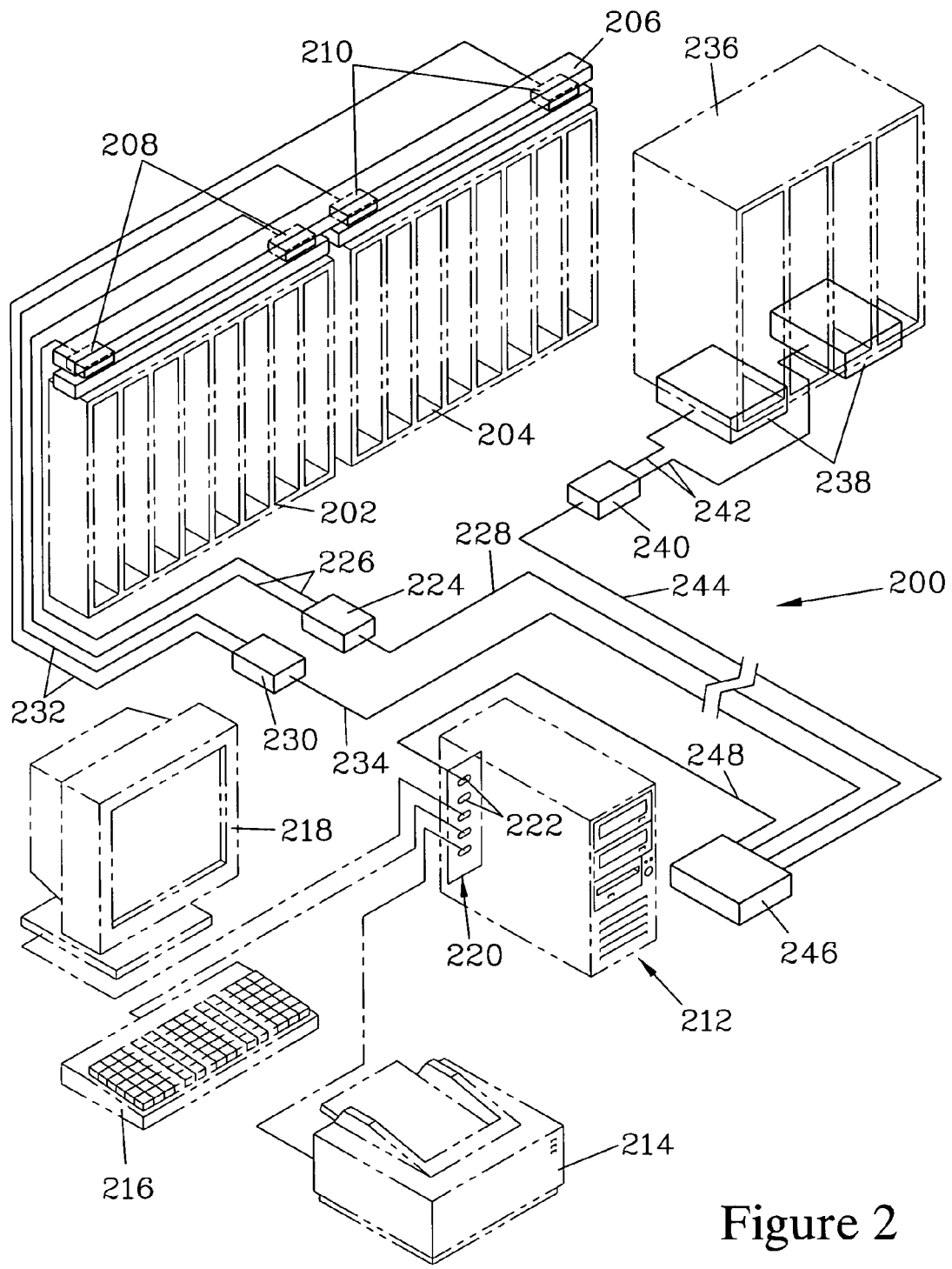
FIG. 2 is a schematic view of an inventory monitoring system that forms another embodiment of the present invention. This system differs from the system shown in FIG. 1 in that the system is designed to monitor an inventory which is carried on multiple platforms which are supported by load cells, and these platforms can be located at a substantial distance from a microcomputer employed to operate the system and which receives weight signals through an RS-485-to-USB converter.

FIG. 2 illustrates another embodiment of the present invention, an inventory monitoring system 200 where multiple platforms are employed. The inventory monitoring system 200 is designed to monitor a first hanging platform 202, which is designed hold a collection of packs of cigarettes, and a second hanging platform 204, which is designed to hold a second collection of packs of cigarettes. These platforms (202, 204) are respectively suspended from a rail 206 by a first pair of load cells 208 and by a second pair of load cells 210.

The inventory monitoring system 200 operates in combination with an available on-site microcomputer 212 which has connected thereto peripherals such as a printer 214, a keyboard 216, and a monitor 218, all of which interface with the microcomputer 212 through an interface panel 220. The interface panel 220 has a collection of typical ports such as a mouse port, a printer port, a monitor port, and might include one or more USB ports, one or more RS-232-compatible serial ports, and an ethernet port, but, for this embodiment, does not contain any serial port that is compatible with RS-485 format. The microcomputer 212 and its peripherals (214, 216, 218) do not form part of the system 200 per se, but are complimentary to the inventory monitoring system 200. The system 200 is designed to accommodate a situation where the microcomputer 212 is at a substantial distance from the hanging platforms (202, 204), which are also complementary to and do not form part of the system 200. In this embodiment, the microcomputer 212, while not having a RS-485 compatible serial port, does have one or more USB ports 222.

The inventory monitoring system 200 has a first load cell hub 224 which combines analog load signals generated by the first pair of load cells 208 and carried by a pair of first load cell conductors 226 to provide a first tagged digital signal in RS-485 format, the tag indicating the platform 202 to which the first tagged digital signal is responsive. The first tagged digital signal is carried by a first tagged signal conductor 228. Similarly, the inventory monitoring system 200 has a second load cell hub 230 which combines analog load signals carried from the second pair of load cells 210 by a pair of second load cell conductors 232 and provides a second tagged digital signal in RS-485 format, the tag again indicating the platform 204 to which the second tagged digital signal is responsive, and the second tagged digital signal being carried by a second tagged signal conductor 234.

The inventory monitoring system 200 is also designed to serve a third platform 236, which is designed to hold a collection of cigarette cartons and which, in this embodiment, is located at a substantial distance from the microcomputer 212. The third platform 236 is supported on a third pair load cells 238. A third load cell hub 240 receives analog load signals generated by the third load cells 238 and carried by a pair of third load cell conductors 242, and combines these load signals so as to provide a tagged digital signal which is in RS-485 format for communication to the microcomputer 212 via a third tagged signal conductor 244.

The use of RS-485 format signals assures that the microcomputer 212 can be located at a substantial distance from the platforms (202, 204, and 236). To allow the RS-485 format digital signals to communicate to the microcomputer 212 through a USB port, an RS-485-to-USB converter 246 is provided. The RS-485 format signals carried by the tagged signal conductors (228, 234, and 244) are passed through the RS-485-to-USB converter 246 and transmitted as USB signals via a USB cable 248 to the USB port 222 of the microcomputer 212.

There are similar converters that will convert an RS-485 or RS-232 signal to an ethernet compatible signal or other desired format for presentation to the microcomputer 212. From a schematic viewpoint, the system would be similar, with the exception of the port used on the microcomputer 212. Similarly, a converter could be employed to convert an RS-485 or RS-232 signal to a radio frequency signal for wireless communication to the microcomputer 212.

Routines similar to those discussed above for determining the maximum distinguishable number and for maintaining the inventory can be employed in the system 200. However, there must be gating routines which allow the user input to be entered separately for each platform, in combination with a flag associated with the platform. Gating information should also be added to the operational routines so that the data is processed on a by-platform basis. While there are various ways that the information for the different platforms (202, 204, 236) can be combined to monitor the inventory, a preferred approach is to maintain a separate inventory log table for each platform, with the results of these log tables being combined into a single inventory log table when reporting. Such an approach is discussed in greater detail below in the description associated with FIG. 4.

Figure 3:
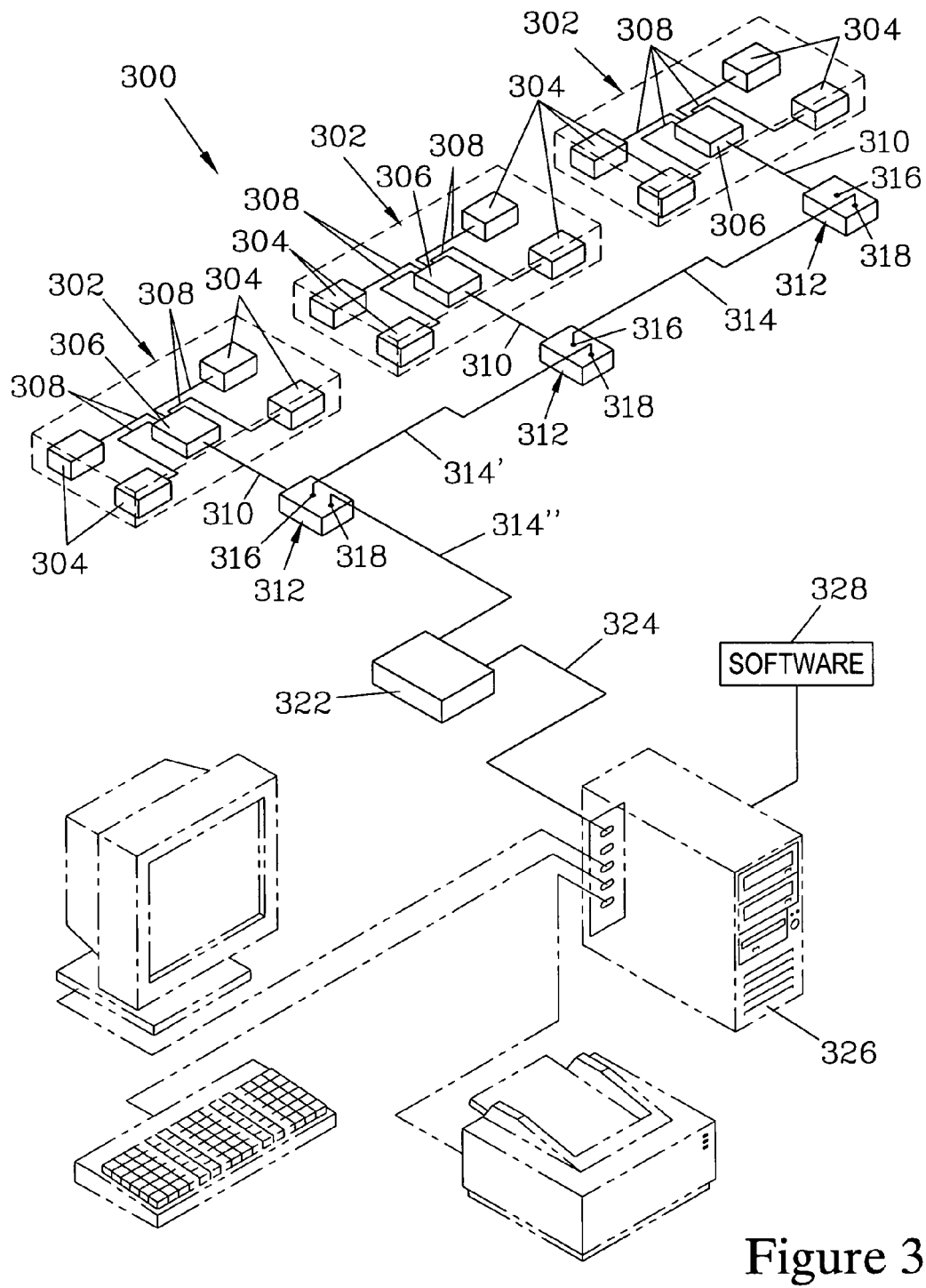
FIG. 3 is a schematic view of an inventory monitoring system that employs multiple electronic scales, one for each platform, and an on-site computer. This embodiment also provides further details on the elements of the scales. The electronic scales are each connected to signal processors which provide a tagged signal indicating the scale from which the signal originated. These signal processors are daisy chained together and connected to a converter box that reformats the signals for presentation to a USB port of the computer.

FIG. 3 illustrates another embodiment of the present invention, an inventory monitoring system 300 which is suitable for use with multiple platforms (not shown). The inventory monitoring system 300 employs a number of electronic scales 302, the outlines of which are shown in dashed lines. Each of the electronic scales 302 is designed to support a platform on which inventory is stored. The electronic scales 302 each have four load cells 304 that communicate to a summing board 306 via load signal conductors 308. Each of the load cells 304 generates a load signal responsive to loads applied thereto, and in this embodiment the load cells 304 have matched responses. The summing board 306 combines the load signals carried by the load signal conductors 308 to provide a combined load signal carried by a scale output conductor 310. The summing board 306 provided also processes the load signals so as to ignore transient readings and provide a digital signal output. Electronic scales having such a configuration of load cells and a summing board are commercially available.

The combined load signal carried by one of the scale output conductors 310 from each of the summing boards 306 is communicated to a signal processor 312 that converts the combined load signal to a tagged digital signal that is in a digital format, such as RS-485 format, and contains an identifier that is unique for each signal processor 312. Thus, the identifier of each tagged digital signal indicates the appropriate one of the electronic scales 302 from which the corresponding combined load signal originated. The tagged digital signals are carried by tagged signal conductors 314 connected to each of the signal processors 312. Each signal processor 312 has an input jack 316 and an output jack 318. The signal processor 312 has the ability to pass signals through from the input jack 316 to the output jack 318, allowing the signal processors 312 to be chained together such that the tagged signal conductor 314" carries a common output that includes the signals carried by the tagged signal conductors 314' and 314. Such signal processors are commercially available.

In the inventory monitoring system 300, the common output of the signal processors 312 carried by the tagged signal conductor 314" is provided to a converter 322 that converts the common output to a reformatted signal transmitted via reformatted signal conductor 324 to a microcomputer 326 with which the inventory monitoring system 300 operates. Chaining together the signal processors 312 to provide the common output signal allows the converter 322 to accept signals from multiple electronic scales 302 with a single input jack. As noted above, one example of a converter 322 is an RS-485-to-USB converter such as are commercially available. Similar converters could be employed to convert the combined output to other formats, such as a wireless format, Ethernet format, or FireWire® format.

The reformatted signal carried by the reformatted signal conductor 324 is provided to the microcomputer 326, which operates under the control of software 328 to provide a user information on the inventory supported by each of the electronic scales 302.

Figure 4:
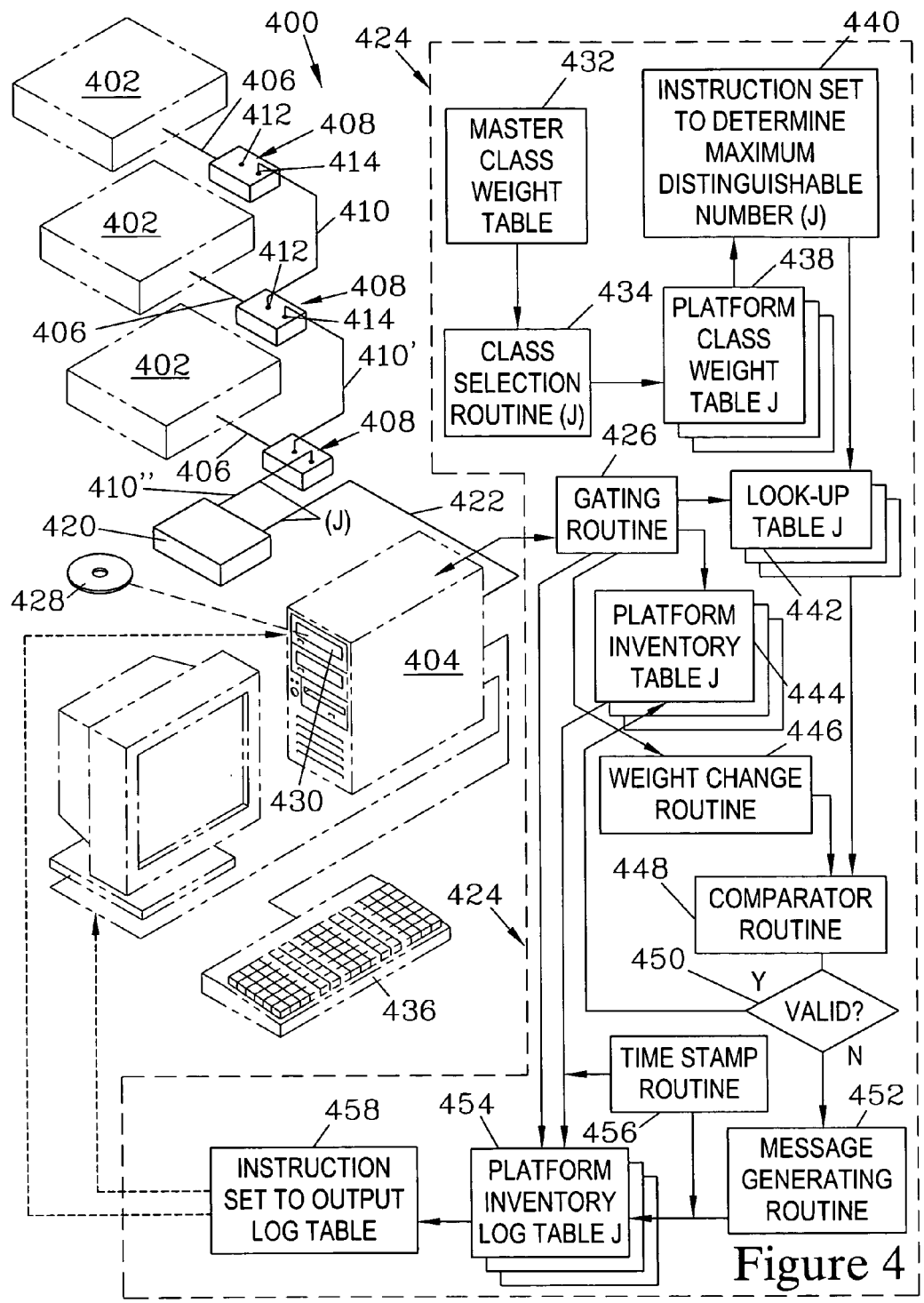
FIG. 4 is a schematic view of another embodiment of the present invention, an inventory monitoring system that has many features in common with the system illustrated in FIG. 3, and details one example of how software can interact with the multiple electronic scales and the microcomputer to provide a functioning system.

FIG. 4 illustrates an inventory monitoring system 400 that forms another embodiment of the present invention. The inventory monitoring system 400 has many features in common with the embodiment shown in FIG. 3, and is designed to be used in combination with a number of electronic scales 402 (three are illustrated) and an on-site microcomputer 404, which do not form part of the inventory monitoring system 400 in this embodiment, and thus are shown in phantom. Rather than using software for indicating signal changes, the inventory monitoring system 400 is designed for a situation where each of the electronic scales 402 has this function incorporated therein. Scale signals are generated when the one of the electronic scales 402 senses a change in the load supported by a platform (not shown) on the electronic scale 402, the load being monitored by a signal change indicator incorporated into the electronic scale 402. The electronic scales 402 also have the capacity to suppress transient signals. FIG. 4 also schematically illustrates details of the functioning of the associated software.

The scale signals are communicated via scale output conductors 406 to signal processors 408 that are each associated with each of the electronic scales 402, and which could be incorporated therein. The signal processors 408 convert each of the scale signals to a tagged signal that is in a digital format, such as RS-485 or RS-232 format, and contains an identifier (J) that is unique for each signal processor 408 and ties the signal back to the electronic scale 402 which generated that particular scale signal. Thus, the identifier (J) of each tagged digital signal indicates the one of the electronic scales 402 from which the scale signal 406 originated. The tagged signals are communicated via tagged signal conductors 410, and each signal processor 408 has an input jack 412 and an output jack 414. The signal processors 408 have the ability to pass signals through from the input jack 412 to the output jack 414, allowing the signal processors 408 to be chained together so that tagged signal conductor 410" carries the combined output of the tagged signals carried by the tagged signal conductors 410' and 410. Such signal processors are commercially available, as mentioned above.

In the inventory monitoring system 400, the output carried by the tagged signal conductor 410", which is the combined (J) tagged signals from the signal processors 408, is provided to a converter 420 that converts the combined output to a common reformatted signal of J-tagged signals carried by a reformatted signal conductor 422. The common reformatted signal in this embodiment is an ethernet signal, and is communicated to the on-site microcomputer 404 via an ethernet port (not shown) of the microcomputer 404.

In this embodiment, the inventory monitoring system 400 is controlled by a software package 424 that enable the microcomputer 404 to provide the necessary functioning of the inventory monitoring system 400. The software package 424 contains routines and tables that are similar to the software routines and tables described in the embodiment of FIG. 1, but differ in that a gating routine 426 is provided which reads the tags associated with the J-tagged signals and indexes and operates on the signals as discussed below.

To operate the system 400, a master class weight table stored on a CD-ROM disk 428 is input into the microcomputer 404 by a CD reader 430 and stored in the software package 424 as a resident master class weight table 432. A class selection routine 434 is provided which allows the user to employ a keyboard 436, which is part of the microcomputer 404, to select the appropriate class weights for a class weight table 438 having J pages, one page being associated with each of the electronic scales 402. Each page of the class weight table 438 contains weight information for the classes of elements being supported by the platform residing on the associated one of the electronic scales 402, and thus this information is matched to the tag J for the tagged signal associated with that particular electronic scale 402 and is recorded on an associated page of the class weight table 438.

An instruction set 440 to determine the maximum distinguishable number is also provided, which is similar to the routine 140 discussed earlier, but which operates in turn on the weight information contained in each page of the platform weight class table 438, generating an associated page in a look-up table 442 for each of the electronic scales 402. Again, there are J pages of the look-up table 442, one associated with each of the electronic scales 402. The instruction set 440 also provides the maximum distinguishable number to the user, as discussed earlier; however, here again, an individual maximum distinguishable number is provided for each of the electronic scales 402. The user can then mark the maximum distinguishable number for each electronic scale 402 onto the platform supported thereon for future reference. Alternatively, if the resulting maximum distinguishable numbers vary, the user may desire to select the lowest result to use as the maximum distinguishable number for all platforms to simplify addition and removal of inventory.

A platform inventory table 444 is provided, again having J pages, one page being associated with each of the electronic scales 402. The content of each page of the platform inventory table 444 corresponds to the weight supported by the associated electronic scale 402 caused by the inventory placed thereon. This correspondence is established either by manually entering the appropriate values or by zeroing the platform inventory table 444 when the platform is empty and then adding inventory in accordance with the maximum distinguishable number associated with that electronic scale 402.

The gating routine 426 reads the tag of the tagged signal carried by the reformatted signal conductor 422 and employs the tag to assure that the look-up table 442 and the platform inventory table 444 are both on the appropriate page to match the tag J as the signal is processed.

A weight change routine 446 is provided that calculates the weight change associated with each change in the reformatted signal transmitted to the microcomputer 404 and provided to the weight change routine 446 via the gating routine 426. Thus, the gating routine 426 associates the signal with the appropriate pages on the tables (442, 444) for the one of the scales 402 from which the weight change originated. The calculated weight generated by the weight change routine 446 is provided to a comparator routine 448 which compares the calculated weight change to the values stored in the appropriate page of the look-up table 442 to find a match. A validity check routine 450 determines whether a valid match is found between the inventory weight change and the appropriate look-up table 442. If no valid match is identified, an error message generating routine 452 generates an error message for a comment field of an inventory log table 454, which again has J pages, the current page being set by the tag J identified by the gating routine 426. The error message is time stamped by a time stamping routine 456. If there is a valid match, then the appropriate page of the platform inventory table 444 is adjusted by the element numbers associated with the calculated weight change in the corresponding page of the look-up table 442. The current new inventory value is then time stamped by the time stamping routine 456 and sent to the appropriate page of the inventory log table 454.

An instruction set 458 to output the contents of the inventory log table 454 is provided, which can be interactive with the user to allow the user to generate custom reports that detail the presentation of the data contained in the inventory log table 454 in a variety of formats. Typical examples might include the time logs of inventory change per platform as well as error reporting per platform, combined reports for the total inventory supported on all platforms, and comparative performance of various platforms. The instruction set 458 can also allow the user select where the information is to be presented, and could be configured to periodically output the information in the inventory log table 454 without requiring the interaction of the user.

Figure 5:
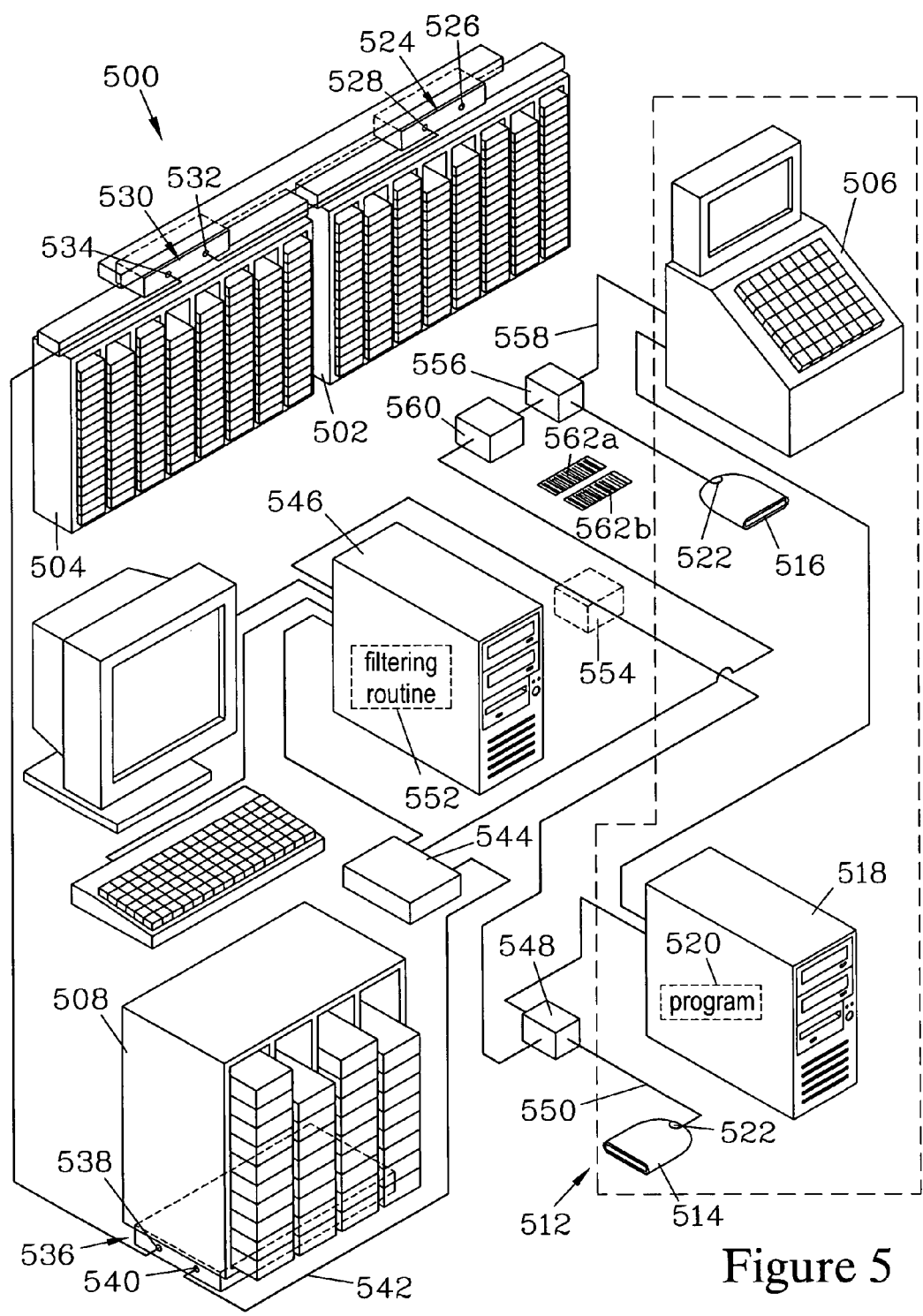
FIG. 5 is a schematic view of another embodiment of the present invention, which is similar to the embodiment shown in FIG. 4. This embodiment has the elements of the embodiment of FIG. 4 and employs multiple platforms. This system is designed to be interactive with the scanners of a store scanning inventory system to provide both weight-based and scanner-based records of change in inventory.

FIG. 5 illustrates another embodiment of the present invention, a platform inventory monitoring system 500 which is designed to be used where packs of cigarettes are stored on a first platform 502 and a second platform 504, these platforms being located in close proximity to the point of sale where a cash register 506 is located. The first platform 502 and the second platform 504 are in close proximity to the cash register 506 so as to be readily accessible to the clerk at the point of sale. A third platform 508 is located in a back room where access is limited. The third platform 508 is dedicated to storing cartons of cigarettes. In the earlier-described embodiments, the inventory is recorded either as packs on the platforms, when they are individual packs, and as cartons when they are so packaged. In this embodiment, cartons are recorded as ten packs of the same species contained therein; by so accounting the cartons, the inventory can be removed as cartons from the third platform 508 and be placed as individual packs on the appropriate platform (502, 504), thereby allowing the back room inventory to be transferred to the point of sale platforms (502, 504) without a need to adjust the inventory.

This embodiment also differs from previous embodiments in that it is designed to cooperate with a store general electronic inventory system 512 to provide a running comparison of the scale-reported inventory changes with the sales-reported inventory changes. The general electronic inventory system 512 is a scanning system which includes the cash register 506. The general electronic inventory system 512 has an input scanner 514 that is used to scan the codes on the inventory when it is initially provided by the supplier. Frequently, the input scanner 514 will be located in the back room so that the inventory can be scanned as it is loaded onto the third platform 508. The cash register 506 is connected to a cash register scanner 516 which inputs the sales to the cash register 506, which in turn reports the sale as inventory removed from the store's running inventory. The general electronic inventory system 512 illustrated also has a store inventory computer 518 which runs inventory control software 520 which tracks the general inventory of the store.

The scanned inventory control software 520 may be able to sort the cigarette inventory and separately store the cigarette inventory information as a function of time for comparison with the records of the platform inventory; however, to do such may require writing software that will depend on the details of the scanning inventory software 520. Since the scanners (514, 516) are scanning standard bar codes which are transferred from the scanner via standard scanning ports 522, typically RS 232 ports, the platform inventory monitoring system 500 in this embodiment is provided with complementary hardware and software that form a supplemental inventory accounting system that independently records the scanned inventory of cigarettes as a function of time, thereby providing a running comparison between the scale-based inventory changes and the sales-based inventory changes. If the scanning-based general electronic inventory system 512 allows one of several elements to be scanned and the number of such elements to be entered as a multiplier, then this option must be disabled and each item must be separately scanned by the scanners (514, 516).

In this embodiment, the first platform 502 is suspended from a first hanging scale 524 which has a first scale input port 526 and a first scale output port 528. The first platform input port 526 can accept signals from another scale and then forward this signal with the signal from the first scale 524 through the first scale output port 528. The second platform 504 is suspended from a second hanging scale 530 which has a second scale input port 532 and a second scale output port 534. The second scale 530 operates in the same manner as the first scale 524. The third platform 508 is supported by a third scale 536 which has a third scale input port 538 and a third scale output port 540, and again can accept and forward signals. All of the scales (524, 530, 536) are designed to operate on RS-485 signals so that the spacial separation between the scales (524, 530, 536) is not a concern. When the scales (524, 530, 536) are daisy chained together as illustrated, they provide a composite scale signal that is responsive to the weight supported on the platforms (502, 504, 508) and is carried by a composite scale output conductor 542. This arrangement allows cartons to be removed from the third platform 508 and either sold, in which case the inventory supported on the platforms (502, 504, 508) is decreased, or broken into individual packs and reloaded onto the appropriate one of the first and second platforms (502, 504), in which case the inventory remains unchanged.

The composite scale signal is converted by a converter 544 from RS-485 format to a format acceptable to a scale management computer 546, such as USB format. The scale management computer 546 employs software that operates in a manner similar to that described above in the discussion of FIG. 4. It should be appreciated that a common computer could be used to provide the function of the two separate computers (518, 546) illustrated.

To maintain an independent scanned record for comparison with the scale-based inventory, an input scanner line data tap 548 is provided, which taps an input scanner line 550 that carries the scanning signals from the input scanner 514 to the store inventory computer 518. The input scanner line data tap 548 provides the signals to a signal filtering routine 552 which is stored in the scale management computer 546. The signal filtering routine 552 sorts the scanner signals for appropriate codes for cigarettes and, when identified, time stamps the inventory record and records the addition to the inventory in a scanned inventory table in the scale management computer 546. This code will be either be recorded as a pack, or as 10 packs if the signal indicates a carton code. Depending on the spacial separation of the input scanner line data tap 548 and the signal type carried by the input scanner line 550, one or more conversion devices 554 may be required to provide the signals to the scale management computer 546.

Similarly, a register scanner line data tap 556 is provided in a register scanner line 558. For this embodiment, it is assumed that the register scanner line data tap 556 is at a considerable distance from the scale management computer 546 and that the signal from the register scanner 516 is an RS-232 signal. In this case, an RS-232 to RS-485 converter 560 is provided to allow the signal to be transmitted as an RS-485 signal. To convert the RS-485 signal to a USB signal for input to the scale management computer 546, the signal is sent to an RS-485 to a USB converter; in this embodiment, the converter 544 is employed, although a separate USB converter could also be employed. The resulting signal is again processed by the signal filtering routine 552; however, the signal received from the register scanner 516 is used to reduce the general electronic inventory maintained by the general purpose general electronic inventory system 512 and, for those items which are relevant, the scanned inventory table maintained by the scale management computer 546.

On occasion, an item is scanned as being sold by the register scanner 516 and then is not sold. In such cases, the sales person typically uses a "delete" key on the register 506 and then re-scans the item with the register scanner 516; the "delete" key instructs the general electronic inventory system 512 to remove rather than add the item thereafter scanned, thereby correcting the initial scanning of the item. This corrects the count of items sold as viewed by the general electronic inventory system 512; however, as viewed by the scale management computer 546, there are two scans of the particular item provided by the signal filtering routine 552. This results in a miscount of two items, since the item is scanned twice but is not actually sold. To correct for this situation, correction bar code cards 562 are employed. When a transaction is to be deleted, the sales person also scans the appropriate one of the correction bar code cards 562; the correction bar code cards 562 are marked with bar codes programmed to be interpreted by the scale management computer 546 as a subtraction of two items (or as an addition of two items to the scanned inventory table), and to be ignored by the general electronic inventory system 512. In this embodiment, which is intended for use for monitoring an inventory of cigarettes, the correction bar code cards 562 include a correction bar code card 562a bearing a bar code which, when transmitted through the register scanner line tap 556 to the scale management computer 546, causes the count of packs scanned out of inventory to be reduced by two packs. Similarly, a correction bar code card 562b bears a bar code programmed to cause the count of cartons scanned out of inventory to be reduced by two cartons, or twenty packs. A similar correction bar code card 562b could be provided at the site of the input scanner 514 to allow correction of scans of cartons loaded onto or removed from the third platform 508.

As discussed above, the system 500 illustrated in FIG. 5 tracks the inventory change based on scanned values as well as based on changes in the weight of inventory supported on the scales. Having this dual inventory monitoring system allows the inventory tables to be cross checked for better control of inventory loss. If the period of time is over an interval where all inventory removed from the rack has been sold and any returns have been restocked in the racks, then two accountings of the inventory should reconcile. If the data are kept in common time-stamped databases, the databases can be plotted over the time interval and compared to aid in gaining a better understanding of any problems which have occurred. The following example illustrates the use of this technique.

Example

Figure 6:
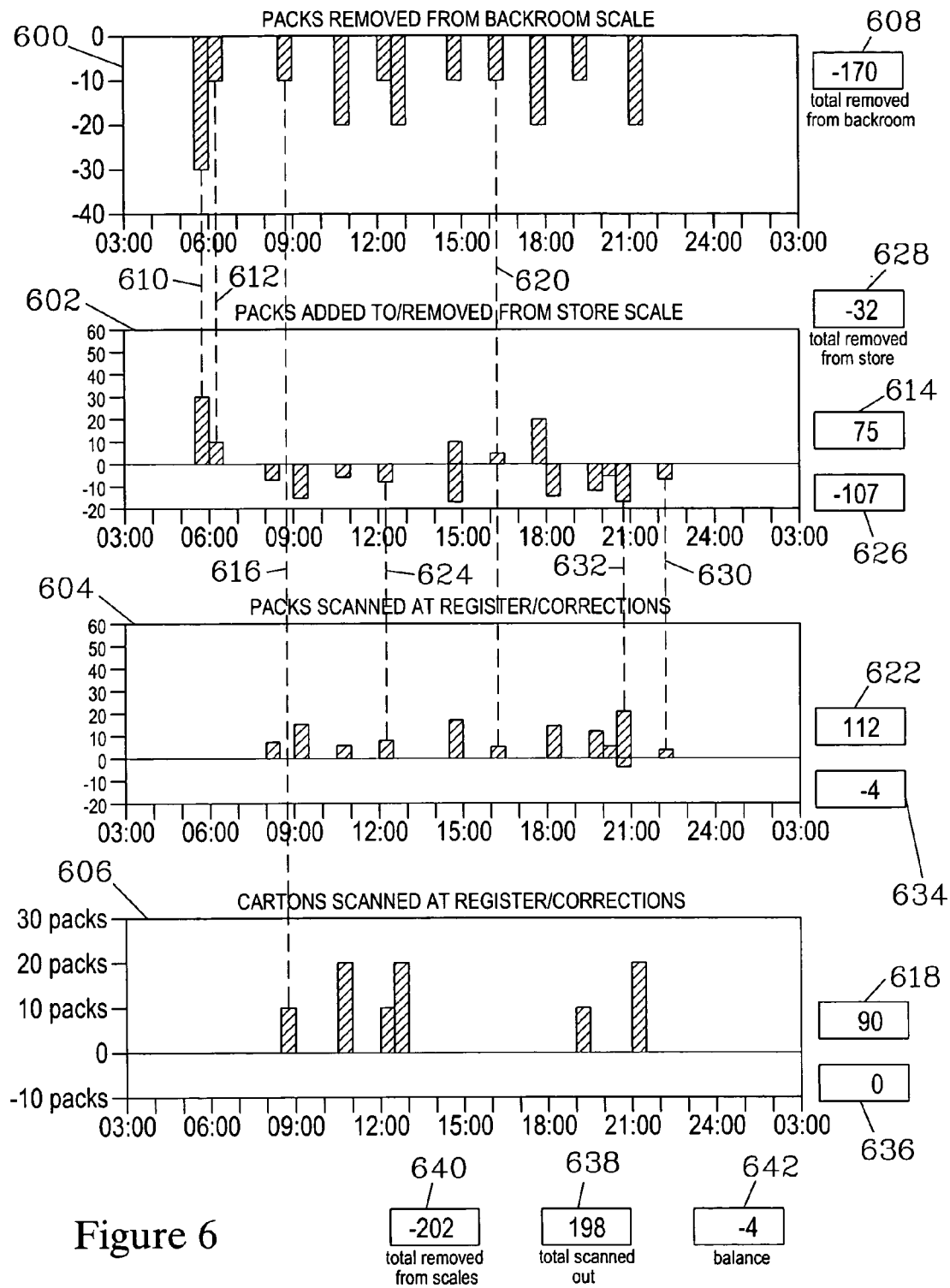
FIGS. 6 and 7 illustrate two series of time-based graphic displays which are designed to display the data obtained from a combined system such as shown in FIG. 5 in such a manner as to allow visual inspection of the data to aid in isolating inventory problems.
Figure 7:
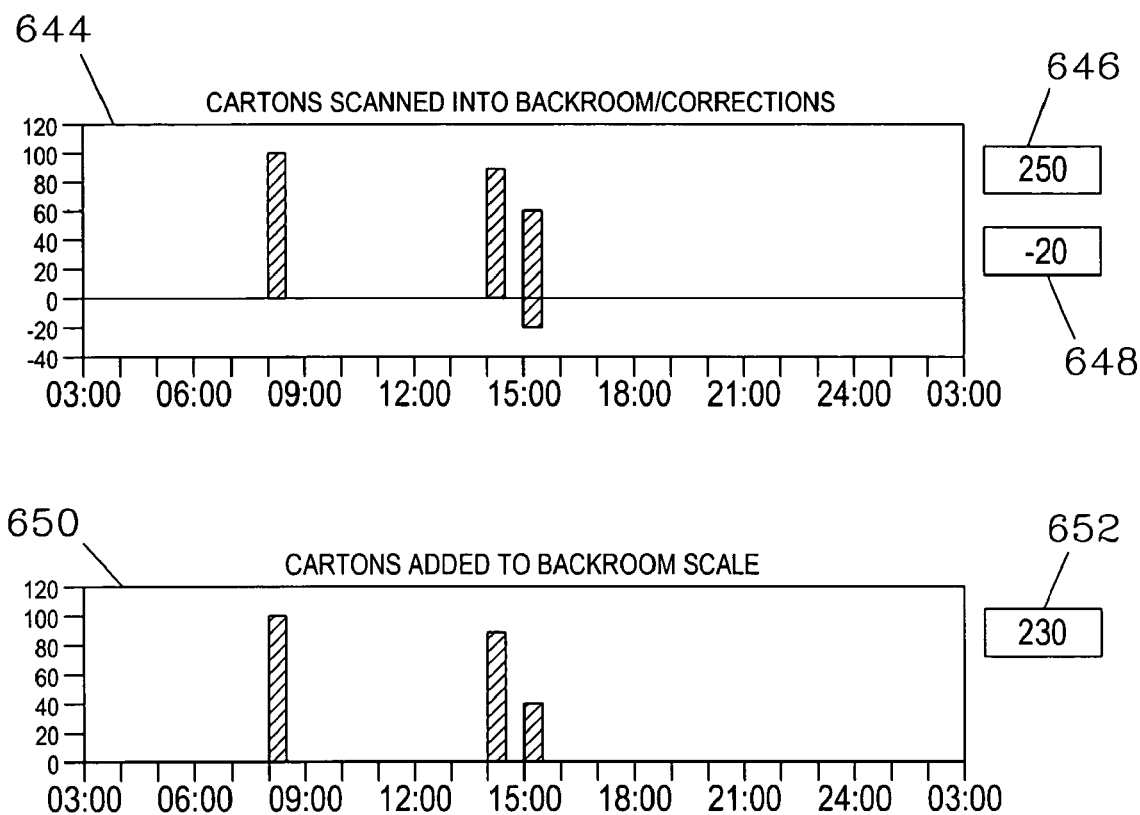

FIGS. 6 and 7 are a series of graphs that are designed to assist with the analysis of the transactions that occur over a set period of time. FIG. 6 tracks the transactions which occurred at the point of sales, as well as the packs removed from the back room. FIG. 7 illustrates one example of graphic displays which might be generated in the back room where inventory is received.

All of the graphs have a horizontal time axis having the same scale for ease of comparison. The vertical axis represents the number of units added or removed, the unit being an individual package of cigarettes. To further assist in the interpretation of the data, there is a collection of windows that provide a quick summary of the totals for the time period displayed.

FIG. 6 shows the graphic display designed to display data relating to sales over a period of time, while FIG. 7 shows a graphic display designed to display data relating to receiving shipments of inventory items. The data are simulated for purposes of discussion.

The display of data relating to sales includes a first graph 600 that displays the count of packs removed from the backroom scale, a second graph 602 that displays the count of packs added to or removed from one or more store scales located at or near the point of sale, a third graph 604 that displays the count of individual packs scanned out of the cash register as well as a count of corrections made by scanning a correction bar code for packs, and a fourth graph 606 that displays the count of packs scanned out of the register as cartons, as well as corrections. As mentioned above, several display windows are also included, which provide a summary of the data for the selected time period as discussed in greater detail below. For the purpose of this example, the time period covers one day, from 03:00 AM until 03:00 AM the following morning, divided into half hour intervals. The 03:00 AM beginning time is chosen since it should be easy to provide a window at this time where cigarettes would not be moved and sales would not be in progress.

The first graph 600 displays the number of packs removed from the backroom scale, which are in multiples of ten, since they are removed as cartons. A backroom scale subtractions summary window 608 displays the total number of packs removed during the selected time period. The cartons removed may be sold, broken down and stocked on the store scales as packs, or may be broken down and some packs sold, the remainder being stocked on the store scales.

For this example, some representative intervals where the inventory is defined as being in transition are as follows:

The time intervals from 05:30-06:00 and 06:00-06:30, indicated respectively by lines 610 and 612, show cartons being removed from the backroom scale, broken into packs, and the packs stocked on the store scales. The data on the first graph 600 along the line 610 show that, during the time interval from 05:30-06:00, three cartons (totaling thirty packs) were removed from the backroom scale, while the data on the second graph 602 shows thirty packs added to the store scales. Similarly, the data along the line 612 show that in the interval from 06:00-06:30, one carton was removed from the back room scale and ten packs were added to the store scales. A store scale additions summary window 614 displays the total number of packs added to the store scales during the time period displayed.

The time interval from 08:30-09:00, indicated by line 616, shows an example where a carton is removed from the backroom scale and sold. The first graph 600 shows ten packs (one carton) removed from the backroom scale, and the corresponding data on the fourth graph 606 shows ten packs scanned out as a carton. A carton scanned out summary window 618 displays the total number of packs scanned out in the form of cartons during the time period.

The time interval from 16:00-16:30, indicated by line 620, shows an example where a carton is removed and broken down into packs, some of which are sold and some of which are stocked onto the store scales. For this time period, the data on the first graph 600 show ten packs (one carton) removed from the backroom scale, the data on the second graph 602 show five packs added to the store scales, and the data on the third graph 604 show five packs scanned out as sold. The total number of packs scanned out during the time period is displayed in a pack scanned out summary window 622.

The time interval from 12:00-12:30, indicated by line 624, shows an example where a number of packs are removed from the store scale and sold during the same time interval. The data for this interval on the second graph 602 show eight packs removed from the store scales, and the data on the third graph 604 show eight packs scanned out. A store scale subtractions summary window 626 displays the total number of packs removed from the store scales during the time period displayed. A scale inventory summary window 628 displays the total change in inventory stored on the store scales over the time period, this value being calculated by subtracting the number of packs removed from the number added.

The time interval from 22:00-22:30, indicated by line 630, shows an example where a number of packs are removed from the store scale, but not all are scanned out during this interval. The data for this interval on the second graph 602 show seven packs removed from the store scales, but the data on the third graph 604 show only three packs scanned out, leaving four packs unaccounted. In the event that these four packs were removed during this interval, but not scanned out until the following interval, such would be indicated in the data for the following interval, from 22:30-23:00. However, in the example illustrated, there are no corresponding scanned out packs, and the four packs are considered missing, possibly stolen.

The time interval from 20:30-21:00, indicated by line 632, shows an example where a number of packs are removed from the store scale and sold during this time interval, but where two of the packs were scanned out but not sold, and were subsequently re-scanned. The data for this interval on the second graph 602 show seventeen packs removed from the store scales, while the data on the third graph 604 show twenty-one packs scanned out. This discrepancy is due to the two packs which were scanned out but not sold, and which were subsequently re-scanned to cancel the sale. To account for this, the third graph 604 also shows data for the number of packs indicated as corrected by use of means such as the correction bar code 562a shown in FIG. 5. In this example, the cashier when cancelling the sale would not only re-scan the two packs, but would also scan the correction bar code twice, providing an indication that the count of packs scanned out should be reduced by four packs. The total of corrected packs indicated over the time period is displayed in a pack scan correction summary window 634. A carton scan correction summary window 636 is also provided, providing similar information, but for correction of re-scanned cartons, rather than packs. Corrections of scans of cartons are displayed on the fourth graph 608.

A scanned inventory summary window 638 displays the total number of packs scanned out during the time period, this number being calculated from the sum of the number of packs scanned out as packs (shown in the pack scanned out summary window 622) and the number of packs scanned out as cartons (shown in the carton scanned out summary window 618), minus the corrections (shown in the pack scan correction summary window 634 and the carton scan correction summary window 636). The number of packs scanned out should be equal to the sum of the total number of packs removed from store scales (shown in the scale inventory summary window 628) and the total number of packs removed, as cartons, from the backroom scale (shown in the backroom scale subtractions summary window 608), this combined number being shown in a total packs removed summary window 640. In the example shown, the total number of packs removed from scales is 202 (170+32), which is greater than the total number of packs scanned out, 198. The difference between these totals is shown in a total balance window 642, which shows a difference of four packs, corresponding to the packs missing during the interval from 22:00-22:30.

FIG. 7 shows the graphic display that might be used to display data relating to receiving shipments of inventory items over the same time period as shown in FIG. 6. The data from the scanning system are displayed on a fifth graph 644, which displays the count of the packs scanned into inventory, as well as a count of corrections made by use of a correction bar code. The totals of these numbers are shown respectively in a backroom scanned in summary windows 646 and a backroom corrections summary window 648. Data from the backroom scale are displayed on a sixth graph 650, which shows the number of packs added to the backroom scale as indicated by weight changes. A total of the number of packs added during the time period is shown in a backroom scale addition summary window 652. It should be noted that, while the graphs are displaying data relating to cartons, the count is maintained in the number of packs added, to facilitate comparisons with the data shown in FIG. 6.

The above described systems have particular utility for performing inventory monitoring which employs the following methods. In its elementary form, the method monitors the inventory changes by noting the weight changes and correlating these changes to the number of articles removed. The inventory should have particular characteristics and should capable of being classified according to these characteristics to be suitable for use with the following described method. The inventory must be subject to division into unique classes that have distinct weights, where the difference from element to element in any class is small and where the elements of each class do not overlap based on small multiples of various elements. Cigarettes are an excellent example of such an inventory.

The inventory is reviewed and, based on the review, is divided into separate classes such that each class has only elements which fall into a unique weight range. A weight table is generated by systematically calculating all combinations of elements by increasing the number until a redundant combination is identified. The maximum number for all combinations of elements is noted.

A rule is established that all withdrawals and additions will be in combinations of less than this maximum. With each withdrawal or addition, the weight change is noted and the number withdrawn is determined and recorded in a log of the change of numbers based on weight. Preferably, these entries also note the time. In the event that no match is found, then it is preferred for an error message to be generated, and it is further preferred for the error message to be time stamped; the weight of the group is preferably recorded as part of the error message. This process is continued after each addition to or removal from the inventory. This will provide a running log of the inventory change, providing the rules are at all times followed. If not, the weights and time should be helpful in assessing the problem. If the inventory is initialized, the above can serve as an inventory monitoring system.

When the weight-managed inventory is associated with a point of sales operation which has an general electronic inventory system which monitors inventory by scanning, it is preferred to have a supplemental inventory accounting system that generates a similar log table based on scanning for the same elements as are monitored by the weight-managed inventory system. This would require screening of the sales so as to only treat those scans that are associated with the sales of interest (e.g. cigarettes). These sales could be entered, as well as entering inventory brought into the store, to provide a record of sales in the same format as the log of the change in numbers based weight. If such is done, it is preferred that the products be individually scanned. It is further preferred for the method to include a correction step which is performed when an item is scanned out of inventory and then back in.

While the above examples have been for inventories of cigarettes, it should be appreciated that the system would have utility for a variety of other applications. Furthermore, while the novel features of the present invention have been described in terms of particular embodiments and preferred applications, it should be appreciated by one skilled in the art that modification of details obviously can be made without departing from the spirit of the invention.

What I claim is:

1. An inventory monitoring system for a storage system having a platform on which is stored an inventory having various classes of elements, wherein each class has an associated element weight characteristic and can have a variable number of elements, the platform in turn being supported by an electronic scale which generates a digital load signal proportional to the load supported by the platform,
the inventory monitoring system interfacing with a microcomputer having,
a communication port for receiving the digital load signal,
at least one user input interface for allowing a user to input information on the inventory stored on the platform, and
at least one output interface for presenting information to the user,
the inventory monitoring system comprising:
means for entering the weight characteristics of the elements of the inventory classes that are to be stored on the platform via the at least one user input interface;
an addressable platform inventory table which is in communication with the microcomputer for recording the number of elements that are stored on the platform;
means for determining, based on the weight characteristics of the inventory classes being stored on the platform, a maximum distinguishable number of elements that can be simultaneously withdrawn from or added to the platform with assurance that the combination will have a distinct weight unique to that combination;
means for presenting said maximum distinguishable number to the user via the at least one output interface;
means for indicating to the microcomputer a change in the digital load signal resulting from a change in the inventory stored on the platform;
means for calculating a weight change corresponding to the change in the digital load signal; and
means for adjusting said platform inventory table responsive to said calculated weight change and for providing a record of current inventory.

2. The inventory monitoring system of claim 1 further comprising:
a platform inventory log table;
means for entering a time-stamped record of current inventory into said platform inventory log table responsive to said means for adjusting said platform inventory table; and
means for presenting said platform inventory log table to the user.

3. The inventory monitoring system of claim 2 further comprising:
means for detecting when said calculated weight change does not correspond to a combined weight of inventory items where the combination has no more items than said maximum distinguishable number and reporting such condition; and
means for reinitializing said platform inventory table.

4. The inventory monitoring system of claim 3 wherein said means for detecting when said calculated weight change does not correspond to a combined weight of inventory items further comprises:
a validity checking routine which checks for weight changes inconsistent with possible combinations of elements totaling no more than said maximum distinguishable number;
means for bypassing said means for adjusting said platform inventory table; and
means for generating a time-stamped error message and recording said error message in said platform inventory log table.

5. The inventory monitoring system of claim 2 wherein said means for adjusting said platform inventory table responsive to said calculated weight change and providing a record of current inventory further comprises:
- a look-up table setting forth the unique weights associated with the allowed combinations of elements that can be withdrawn from the platform at one time consistent with said maximum distinguishable number; and
- means for selecting from said look-up table the inventory change having a combination weight corresponding to said calculated weight change and for adjusting the current inventory in accordance with said selected inventory change.

6. The inventory monitoring system of claim 4 wherein said means for adjusting said platform inventory table responsive to said calculated weight change and providing a record of current inventory further comprises:
- a look-up table setting forth the unique weights associated with the allowed combinations of elements that can be withdrawn from the platform at one time consistent with said maximum distinguishable number; and
- means for selecting from said look-up table the inventory change having a combination weight corresponding to said calculated weight change and for adjusting the current inventory in accordance with said selected inventory change.

7. The inventory monitoring system of claim 6 wherein the platform is configured to store an inventory of cigarettes.

8. The inventory monitoring system of claim 2 wherein the inventory system is used in conjunction with a scanned general electronic inventory system which has an input scanner generating an input scanner signal and a point of sales scanner generating a register scanner signal, the inventory system further comprising:
- a supplemental inventory accounting system having,
  - sampling taps for accessing the input scanner signal and the register scanner signal without interference,
  - means for filtering the tapped scanner signals to select data relating to the products stored on the platform,
  - a selected scanned inventory table for reporting the filtered data,
  - means for sending the filtered data to said selected scanned inventory table,
  - a selected scanned inventory log table,
  - means for entering a time-stamped record of selected scanned current inventory into said selected scanned inventory log table responsive to said means for filtering the tapped scanner signals, and
  - means for presenting said selected scanned inventory log table to the user.

9. The inventory system of claim 8 further comprising:
means for entering a correction to the selected scanned current inventory into said selected scanned inventory log table.

10. The inventory system of claim 9 further comprising:
means for comparing said selected scanned log inventory table to said platform inventory log table.

11. The inventory monitoring system of claim 10 wherein the platform is configured to store an inventory of cigarettes.

12. An inventory monitoring system for a storage system having J platforms, each of the J platforms having an inventory stored thereon having various classes of elements wherein each class has an associated element weight characteristic and can have a variable number of elements, each of the J platforms in turn being supported by one of J electronic scales, each of the J electronic scales having,
- at least one load cell which supports the platform and provides a load signal proportional to the weight of the inventory stored on the platform,
- a signal converter for converting the load signal from the at least one load cell into a tagged digital signal where the tag is unique for that particular one of the J electronic scales, the inventory monitoring system being designed for use with a computer having,
- a communication port for receiving the tagged digital signals,
- at least one user input interface for allowing a user to input information on the inventory classes stored on each of the platforms, and
- at least one output interface for presenting information to a user, the inventory monitoring system comprising:
- a platform inventory table accessible to the computer and having J pages for recording the number of elements that are stored on the platforms, each of said pages being associated with one of the J electronic scales;
- means for entering the weight characteristics of the elements of the inventory classes that are to be stored on each of the J platforms via the at least one user input interface;
- means for determining, based on the weight characteristics of the inventory classes being stored on each of the J platforms, a maximum distinguishable number of elements that can be simultaneously withdrawn from or added to the associated one of the J platforms with assurance that the combination will have a distinct weight unique to that combination;
- means for presenting said maximum distinguishable number to a user via the at least one output interface;
- means for initializing each of said J pages of said platform inventory table;
- a gating routine for selecting an appropriate one of said J pages of said platform inventory table to correspond to the tag associated with each of the tagged digital signals and advancing the signal;
- means for calculating a weight change associated with the Jth scale responsive to said advanced signal; and
- means for adjusting said selected appropriate one of said J pages of said platform inventory table responsive to said calculated weight change and for providing a record of current inventory stored on each of the platforms.

13. The inventory monitoring system of claim 12 further comprising:
- a platform inventory log table accessible to the computer and having J pages for recording the number of elements that are stored on the platforms, each of said pages being associated with one of the J electronic scales;

further wherein said gating routine also serves to select an appropriate one of said pages of said platform inventory log table to correspond to the tag associated with each of the tagged digital signals; and the inventory monitoring system still further comprising:
- means for entering a time-stamped record of current inventory into said selected appropriate page of said platform inventory log table responsive to said means for adjusting said selected appropriate one of said J pages of said platform inventory table; and
- means for presenting said platform inventory log table to the user.

14. The inventory monitoring system of claim 13 further comprising;
- means for detecting when said calculated weight change does not correspond to a combined weight of inventory items where the combination has no more items than said maximum distinguishable number and reporting such condition.

15. The inventory monitoring system of claim 14 wherein said means for adjusting said selected appropriate one of said J pages of said platform inventory table responsive to said calculated weight change and for providing a record of current inventory stored on each of the platforms further comprises:
   a look-up table having J pages, each page setting forth the unique weights associated with the allowed combinations of elements that can be withdrawn at one time from the platform supported on an associated one of the J electronic scales consistent with said maximum distinguishable number; and
   means for selecting, from the appropriate page of said look-up table, the inventory change having a combination weight corresponding to said calculated weight change and for adjusting the record of current inventory stored on the platform associated with the associated one of the J electronic scales in accordance with said selected inventory change.

16. The inventory monitoring system of claim 15 wherein the inventory system is used in conjunction with a scanned general electronic inventory system which has an input scanner generating an input scanner signal and a point of sales scanner generating a register scanner signal so as to form a composite inventory monitoring system, the composite inventory monitoring system further comprising:
   a supplemental inventory accounting system having,
      a sampling tap for monitoring the input scanner signal and the register scanner signal,
      means for filtering the tapped scanner signals to select data relating to the products stored on the J platforms,
      a selected scanned inventory table for reporting the filtered data,
      means for sending the filtered data to said selected scanned inventory table, and
      means for time stamping the filtered data in response to said means for sending the filtered data to said selected scanned inventory table so as to create a time stamped log of said scanned inventory table; and
   means for correlating the time dependance of said platform inventory log table and said time stamped log of said scanned inventory table.

17. A method of reporting inventory stored on a platform supported on an electronic scale, the method comprising the steps of:
   dividing the inventory into separate classes where each class of elements has a unique weight range;
   determining the unique combinations of elements from the weight ranges;
   establishing a table of the weights and associated combination numbers;
   setting a maximum number of elements that can be simultaneously added or withdrawn,
      the maximum number being set such that a combination of items having no more elements than the maximum number will have a distinct combination weight;
   adding inventory elements to or removing inventory elements from the platform in groups of elements numbering less than or equal to the set maximum number;
   using the electronic scale to measure the weight changes which occur as inventory is added to or removed from the platform;
   determining a change of inventory correlating to the measured change in weight;
   making a log based on the determined change in inventory and the time;
   if no match can be identified, recording the weight change and time; and
   return to said step of measuring the weight changes.

18. The method of claim 17 wherein the inventory is cigarettes and the classes contain both packs and cartons.

19. The method of claim 18 wherein the total inventory value for packs is maintained by creating a tenfold multiple for cartons and adding the result to the pack count, further wherein the inventory is dynamic such that new inventory can be stocked by adding cartons, and packs are restocked by removing cartons, breaking the cartons and reloading the contents as packs.

20. The method of claim 19 wherein the method is employed in combination with a method of electronically maintaining a store inventory by scanning in and out of the inventory items one at a time, the combined method further comprising the steps of:
   selectively monitoring the inventory added and the inventory sold at point of sale;
   making a receipt/sale log of those inventory changes that correspond to the inventory stored on the platform and the time of occurrence of such changes; and
   comparing said log based on weight of inventory to said receipt/sale log.

21. An inventory monitoring system for a storage system having J platforms, each of the J platforms having an inventory stored thereon having various classes of elements wherein each class has an associated element weight characteristic and can have a variable number of elements, each of the J platforms in turn being supported by one of J electronic scales, each of the J electronic scales having,
   at least one load cell which supports the platform and provides a load signal proportional to the weight of the inventory stored on the platform,
   a signal converter for converting the load signal from the at least one load cell into a tagged digital signal where the tag is unique for that particular one of the J electronic scales,
the inventory monitoring system being designed for use with a computer having,
   a communication port for receiving the tagged digital signals,
   at least one user input interface for allowing a user to input information on the inventory classes stored on each of the platforms, and
   at least one output interface for presenting information to a user,
the inventory monitoring system comprising:
   a platform inventory table accessible to the computer for recording the number of elements that are stored on the platforms;
   means for entering the weight characteristics of the elements of the inventory classes that are to be stored on each of the J platforms via the at least one user input interface;
   means for determining, based on the weight characteristics of the inventory classes being stored on each of the J platforms, a maximum distinguishable number of elements that can be simultaneously withdrawn from or added to the associated one of the J platforms with assurance that the combination will have a distinct weight unique to that combination;
   means for presenting said maximum distinguishable number to a user via the at least one output interface;
   means for initializing said platform inventory table;

a gating routine for selecting an appropriate one of said J platforms to correspond to the tag associated with each of the J tagged digital signals and advancing the signal;

means for calculating a weight change associated with the Jth scale responsive to said advanced signal; and means for adjusting said platform inventory table responsive to said calculated weight change and for providing a record of current inventory stored on the J platforms.

22. The inventory monitoring system of claim 21 further comprising:

a platform inventory log table accessible to the computer for recording the number of elements that are stored on the platforms;

means for entering a time-stamped record of current inventory into said platform inventory log table responsive to said means for adjusting said platform inventory table; and means for presenting said platform inventory log table to the user.

23. The inventory monitoring system of claim 22 further comprising;

means for detecting when said calculated weight change does not correspond to a combined weight of inventory items where the combination has no more items than said maximum distinguishable number for the one of said J platforms associated with the tag of said advanced signal and for reporting such condition.

24. The inventory monitoring system of claim 23 wherein said means for adjusting said platform inventory table responsive to said calculated weight change and for providing a record of current inventory further comprises:

a look-up table having J pages, each page setting forth the unique weights associated with the allowed combinations of elements that can be withdrawn at one time from the platform supported on an associated one of the J electronic scales consistent with said maximum distinguishable number; and means for selecting, from the appropriate page of said look-up table, the inventory change having a combination weight corresponding to said calculated weight change and for adjusting the record of current inventory in accordance with said selected inventory change.

\* \* \* \* \*